United States Patent [19]

Richardson

[11] 4,054,633

[45] Oct. 18, 1977

[54] PROCESS FOR CONTINUOUSLY PREPARING SHAPED ARTICLES OF AROMATIC OXADIAZOLE OR AROMATIC OXADIAZOLE/N-ALKYLHYDRAZIDE POLYMERS FROM MONOMER SOLUTIONS

[75] Inventor: John C. Richardson, Cantonment, Fla.

[73] Assignee: Monsanto Company, St. Louis, Mo.

[21] Appl. No.: 686,206

[22] Filed: May 13, 1976

[51] Int. Cl.² ............................................. D01F 6/00
[52] U.S. Cl. ................................. 264/184; 260/78 R; 260/78 TF
[58] Field of Search .............. 260/78.41, 78 R, 78 TF; 264/184

[56] References Cited

U.S. PATENT DOCUMENTS

| 3,886,251 | 5/1975 | Sekiguchi et al. | 264/184 |
| 3,944,522 | 3/1976 | Tohyama et al. | 260/47 CP |

FOREIGN PATENT DOCUMENTS

| 1,407,439 | 9/1975 | United Kingdom | 264/184 |
| 1,417,568 | 12/1975 | United Kingdom | 264/184 |

*Primary Examiner*—Jay H. Woo
*Attorney, Agent, or Firm*—John W. Whisler

[57] ABSTRACT

An economical process for continuously producing shaped articles of aromatic oxadiazole or aromatic oxadiazole/N-alkylhydrazide polymers from certain monomer solutions is provided. The process involves continuously feeding monomer solution into a heated, pressurized continuous reactor to provide dope which is continuously extruded into an aqueous medium to provide a shaped article.

10 Claims, No Drawings

PROCESS FOR CONTINUOUSLY PREPARING SHAPED ARTICLES OF AROMATIC OXADIAZOLE OR AROMATIC OXADIAZOLE/N-ALKYLHYDRAZIDE POLYMERS FROM MONOMER SOLUTIONS

BACKGROUND OF THE INVENTION

A. Field of the Invention

This invention relates to a novel process for continuously producing shaped articles of oxadiazole polymers from certain monomer solutions. As used herein, the term "oxadiazole polymer" means a fiber-forming polymer consisting essentially of recurring units of the formula — AR — X —, where Ar is a divalent aromatic radical and X is a radical selected from the group consisting of

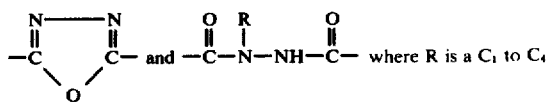

alkyl, with the proviso that in at least 20% of said units X is

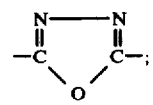

the term "monomers" means monomers from which oxadiazole polymers are prepared; and the term "monomer solution" means an oleum, chlorosulfonic acid and/or polyphosphoric acid solution of monomers.

Inherent viscosity ($\eta_{inh}$) values, when given herein, are measured at 25° C. and are defined by the following equation:

$$\eta_{inh} = \frac{\ln RV}{C}$$

where C represents a solids concentration of 0.2 gram of polymer per 100 ml of concentrated sulfuric acid as solvent and RV represents relative viscosity. The relative viscosity (RV) is determined by dividing the flow time in a capillary viscometer of a dilute polymer solution by the flow time for the pure solvent. The solids concentration of the dope is calculated and then a portion or sample of this dope is diluted with an appropriate amount of concentrated sulfuric acid to obtain a solution having a solids concentration of 0.2 g. of polymer per 100 ml of concentrated sulfuric acid. Brookfield viscosity values, when given herein, are measured at 25° C. by conventional techniques.

B. Description of the Prior Art

Processes for preparing fibers of oxadiazole polymer from monomer solutions are taught in British Pat. Nos. 1,407,439 and 1,417,568 and U.S. Pat. No. 3,886,251. These processes involve heating a monomer solution in a kettle-type reactor at a temperature of from 140°-150° C. for from 4 to 6 hours in order to effect polymerization of the monomers and provide a dope (polymer solution). The dope is diluted with concentrated sulfuric acid to reduce its viscosity to an acceptable level for extrusion and then degassed to prevent extrusion difficulties and product deficiencies. The diluted and degassed dope is then cooled to a temperature of less than about 100° C. and extruded from the kettle-type reactor or other similar reservoir through a heated spinneret into an aqueous medium to form fiber.

The above-described processes have several serious drawbacks from the standpoint of commercial scale operations. A major disadvantage of these processes is that the viscosity of dopes which can be extruded by utilizing the process is limited to about 30,000 poise which in turn limits the solids concentration of the dopes. The term "solids concentration" as used herein means that portion of the dope, expressed as a weight percent, which would be expected to precipitate as oxadiazole polymer when the dope is combined with an aqueous medium, assuming that the monomers used in preparing the dope reacted stoichiometrically. Naturally, for commercial operations it is desirable to utilize dopes having the highest possible solids concentration so as to attain high productivity and reduce the cost of solvent and solvent recovery. Attempts to utilize dopes of higher viscosity in this process have not proven successful. While the apparent viscosity of the dope can be reduced by elevating the temperature of the dope, unfortunately, significant degradation of the polymer occurs when the dope is heated and held for any period of time at temperatures above about 140° C. prior to extrusion.

It is an object of the present invention to provide a process for producing shaped articles of oxadiazole polymers from monomer solutions which avoids the problems described above.

Other objects of the invention will become apparent to those skilled in the art from the following detailed description of the invention.

SUMMARY OF THE INVENTION

The process of the present invention provides an economical and commercially attractive process for preparing shaped articles of oxadiazole polymers from monomer solutions. In general, the process of the present invention avoids the problems of the above-described process by utilizing a continuous reactor rather than a kettle-type reactor. More specifically, in accordance with the present invention dopes having relatively higher solids concentrations are prepared in a heated, pressurized continuous reactor and extruded therefrom to provide useful shaped articles of of oxadiazole polymers preferably without diluting. degassing or cooling the dope, wherein the residence time of materials in the reactor is from about 2 to about 60 minutes. The process of the present invention comprises:

a. continuously introducing into a heated and pressurized continuous reactor an acid solution consisting essentially of monomers from which an oxadiazole polymer is prepared and an acid selected from the group consisting of oleum, chlorosulfonic acid, polyphosphoric acid and mixtures thereof, said reactor being maintained at a temperature sufficient to effect polymerization of said monomers and at a pressure sufficient to keep the contents thereof in the liquid phase, whereby said monomers polymerize to provide a dope, and b. continuously extruding said dope into an aqueous coagulating medium to obtain a shaped article of oxadiazole polymer.

DETAILED DESCRIPTION OF THE PREFERRED EMBODIMENTS

The process of this invention involves continuously introducing a monomer solution into a heated, pressurized continuous reactor to provide a dope which is continuously extruded from the reactor to provide shaped articles. Preferred continuous reactors for use with the invention are tubular reactors. The term "tubular reactor" as used herein means a hollow elongated reactor having a circular, eliptical, triangular, square or the like cross-section. Other continuous reactors include pump reactors and the like.

Monomer solutions useful in practicing the process of this invention are described in the above-mentioned patents. However, it is contemplated that any monomer(s) which polymerize in acid to provide Copolymer A may be used in practicing the invention. In general, the monomer solutions are prepared by adding the monomers to oleum, chlorosulfonic acid and/or polyphosphoric acid with stirring at about 60° C. until a solution is formed. The monomers preferably consist of an appropriate hydrazine salt, such as hydrazine sulfate ($HySO_4$), and one or more carbonyl-containing compounds of the formula (I)

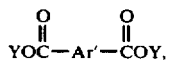

where Y is —H or a $C_1$ to $C_4$ alkyl and Ar' is

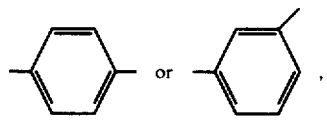

in a mole ratio of about 1:1 to 2:1, $HySO_4$ to formula (I) compound(s). Preferably, the monomers are first blended and then added to the acid.

Preferred formula (I) compound(s) are those wherein R is —H or —$CH_3$ and include: terephthalic acid (TA), isophthalic acid (IA) and the dimethyl esters thereof, i.e., dimethylterephthalate (DMT) and dimethylisophthalate (DMI). In preparing shaped articles of an oxadiazole polymer composed of units of the formula

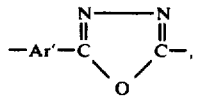

TA and/or IA are used, whereas in preparing shaped articles of an oxadiazole polymer composed of units of the formula

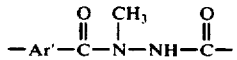

in addition to the foregoing units DMT and/or DMI is preferably used. If desired, an amount of the DMT and/or DMI may be replaced with an equivalent molar amount of TA and/or IA.

$HySO_4$ may be in the form of monohydrazine sulfate, dihydrazine sulfate or mixtures thereof. Preferably, $HySO_4$ is employed in a slight excess (up to 5 mole %) of the amount theoretically required to react with Formula I compound(s). In general, increasing the mole ratio of the amount of excess $HySO_4$ present in the monomer solution results in an increase in the viscosity of the polymer and dope formed upon polymerization of the monomers. Although $HySO_4$ is preferably used in preparing the monomer solutions, a portion of all of the $HySO_4$ may be replaced with an equivalent amount of another hydrazine salt or terephthaloyldihydrazide and/or isophthaloyldihydrazide.

In using oleum or polyphosphoric acid to prepare the monomer solutions, the respective acids, of course, must contain sufficient $SO_3$ or $P_2O_5$ to combine with the water formed when the monomers are polymerized in acid. It is common to express the amount of $SO_3$ or $P_2O_5$ present in the respective acid in terms of utilization; for example, when using oleum, if there is only sufficient $SO_3$ present to combine with the water formed when the monomers are polymerized therein, the $SO_3$ utilization is 100%. On the other hand, if only 60% of the $SO_3$ present in the oleum combines with the water formed when the monomers are polymerized, then the $SO_3$ utilization is 60%. Preferably the $SO_3$ or $P_2O_5$ utilization is between 10 and 90% with a utilization of between 30 and 80% beeing particularly preferred. The preferred acid for use in practicing the process of the invention is oleum due to its cost, availability and low viscosity.

When preparing shaped articles of oxadiazole polymers containing

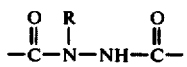

units, an alkylating agent such as an alcohol of the formula ROH, where R is a $C_1$ to $C_4$ alkyl (e.g. methanol), a $C_1$ to $C_4$ alkyl sulfate or phosphate (e.g. mono- or dimethyl sulfate), or the like may be predissolved in the acid or carbonyl-containing compound to control or increase the proportion of

units in the oxadiazole polymers. Preferably, the alkylating agent is predissolved in the acid. The amount of alkylating agent used may range from none to an amount sufficient to provide a mole ratio or alkylating agent to hydrazine sulfate of about 5:1.

Preferably, the monomer solution is continuously introduced into a tubular reactor by means of a positive displacement pump. Tubular reactors useful in practicing this invention preferably contain internal mixing structures to produce good heat transfer, mixing of the liquid and plug flow such as the static mixing elements disclosed in U.S. Pat. Nos. 3,286,992 and 3,800,985. The reactor is heated at a temperature sufficient to effect polymerization of the monomers, whereby dope is prepared in the reactor. The heating of the reactor may be accomplished by coventional means, for example, by immersing the reactor in a heating medium such as oil or by jacketing the reactor with such a medium or by electrically heating the reactor. When the monomers solution solvent is oleum, the reactor is preferably heated at a temperature between about 140° C. and 180° C.; when the solvent is chlorosulfonic acid, the reactor is preferably heated at a temperature between about 100° C. and 180° C.; and when the solvent is polyphosphoric acid, the reactor is preferably heated at a temperature between about 160° C. and 225° C. Under these conditions, significant degradation of the materials does not occur within a reasonable time. Usually, the residence time of the materials (reactants and acid) in the reactor will range from about 2 to 60 minutes, for example, from 5 to 30 minutes. The actual residence time of the materials will depend of course on the desired composition of the polymeric product, cross-section and length of the reactor, temperatures of the reactor and the like.

Dope is continuously extruded into an aqueous medium to provide shaped articles by conventional techniques, such as the techniques describes in British Pat. Nos. 1,407,439 and 1,417,568 and U.S. Pat. No. 3,886,251. Preferably, the dope is continuously extruded directly from the reactor into the aqueous medium. However, if desired, the dope may be continuously passed from the reactor into a stirred dope catching vessel from which the dope is then continuously extruded into the aqueous medium. The reactor pressure is maintained within a pressure range sufficient to maintain the contents of the reactor in the liquid phase.

In shaping fibers, the spinneret may be immersed in the aqueous medium or it may be positioned a short distance (0.3 cm to 5 cm) above the aqueous medium as described in British Pat. No. 1,417,568. The aqueous medium preferably consists of an aqueous solution of the acid used in preparing the monomer solutions or water. As the acid content of the aqueous medium increases, the rate of coagulation of the polymer tends to decrease. Generally, adequate coagulation is attained when the aqueous medium contains between 8% and 50% by weight acid.

PROCESS CONSIDERATIONS

In accordance with the present invention an oxadiazole polymeric product of a desired composition and inherent viscosity (e.g. between 2 and 8) can be obtained by selecting and controlling the conditions under which the process is carried out. For example, useful fibers of oxadiazole polymer consisting essentially of recurring units (I) of the formula

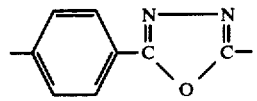

and units (II) of the formula

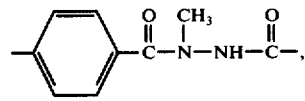

wherein the mole ratio of units (I) to (II) is about 1 to 1, maybe prepared from monomer solutions consisting of DMT and HySO₄ dissolved in oleum by utilizing a cylindrical reactor (2.5 cm x 30 cm) immersed in an oil bath and the following conditions:

A. Mole ratio of HySO₄ to DMT in monomer solution — 1.03:1.00
B. Mole ratio of SO₃ to DMT in monomer solution — 4:04:1.00
C. Solids concentration — 7%
D. Oil bath temperature — 160° C.
E. Residence time of liquid in reactor — 20 minutes The monomer solution is fed into the reactor at a rate of 22.5 grams per minute by means of a positive displacement pump. Under the stated conditions, the dope normally will have a Brookfield viscosity of about 38.000 poise and the contents of the reactor are maintained in the liquid phase.

Changing any one of the above-listed conditions (A through E) while holding the other conditions the same will alter the characteristics of the dope and polymeric product in the manner shown in the following table.

TABLE

|  | A↑ | B↑ | C↑ | D↑ | E↑ |
|---|---|---|---|---|---|
| Viscosity of dope and polymer | ↑ | ↑ | ↑ | ↑↓ | ↑↓ |
| Mole ratio of units (I) to (II) | NC | ↓ | ↓ | ↓ | ↓ |

In the Table ↑ means increases, ↓ means decreases, ↑↓ means increases through a maximum value and thereafter decreases, and NC means no change. It has also been found that when a portion of the DMT of the monomer solution is replaced by an equivalent molar amount of TA, an increase in the mole ratio of units (I) to units (II) results. In general, the foregoing relationships exist for any selected set of process conditions.

In general, the dopes utilized in practicing the process of this invention may have Brookfield viscosities ranging from about 8,000 to 80,000 poise and comprise from 2 to 20% by weight of polymer having an inherent viscosity ranging from about 1 to 10.

The following examples are given for the purpose of further illustrating the invention and are not intended to in any way limit the invention. In the examples, the term "Type A Tubular Reactor" has reference to a U-shaped cylindrical reactor (2.5 cm × 30 cm) and the term "Type B Tubular Reactor" has reference to an S-shaped cylindrical reactor (2.5 cm × 90 cm). In the experiments described in the examples the reactor in each instance was heated by immersing the reactor in a heated oil bath.

EXAMPLE 1

This example illustrates the preparation of polymeric fiber consisting essentially of recurring units (I) of the formula

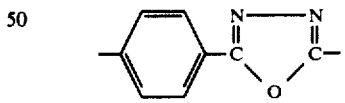

and units (II) of the formula

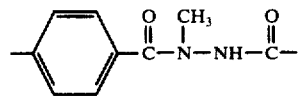

in a mole ratio of about 30 to 70 (units I to II) by the process of the present invention.

A monomer solution consisting of about 15% by weight of DMT and HySO₄ in a mole ratio of 1 to 1.03 in oleum (SO₃ utilization of 65%) was introduced at the rate of 19 grams per minute into a heated (150° C.) Type B Tubular Reactor by means of a positive displacement pump. A heated (150° C.) spinneret with 25, 6 mil (0.15 mm.), holes was attached to the exit end of the reactor.

The conditions used in these experiments and the results obtained are given in the following Table:

TABLE

| Conditions and Results | EXAMPLES | | | | | |
|---|---|---|---|---|---|---|
| | 2 | 3 | 4 | 5 | 6 | 7 |
| 1. Mole Ratio DMT to H₂SO₄ | 1 to 1.05 | 1 to 1.03 | 1 to 1.03 | 1 to 1.05 | 1 to 1.05 | 1 to 1.03 |
| 2. Mole Ratio SO₃ to DMT | 4.05 to 1 | 4.05 to 1 | 4.05 to 1 | 4.05 to 1 | 4.05 to 1 | 4.05 to 1 |
| 3. Monomer Feed Rate (grams/min.) | 19 | 19 | 45 | 19.6 | 25 | 22.5 |
| 4. Reactor Type (A or B) | B | A | B | B | B | B |
| 5. Reactor Temp. (° C.) | 170 | 171 | 170 | 160 | 170 | 165 |
| 6. Pressure in Reactor (atm) | 11.89 | 5.76 | 6.44 | 20 | 9.52 | 4.76 |
| 7. Dope viscosity (poise) | 36,000 | 38,720 | 41,280 | 38,400 | 7,360 | 64,320 |
| 8. $\eta_{inh}$ of Polymer of the Dope | 3.46 | 3.45 | 3.52 | 2.85 | 2.05 | 3.85 |
| 9. Solids Concentration of Dope (%) | 7 | 7 | 7 | 9 | 9 | 7 |
| 10. Residence Time of Liquid in the Reactor (minutes) | 30 | 23 | 13.33 | 30 | 24 | 26.67 |
| 11. % Units (I)[a] in Polymeric Product | 45.7 | 48 | 25.3 | 81.7 | 85.8 | 38 |
| 12. % units (II)[b] in Polymeric Product | 54.3 | 52 | 74.7 | 18.3 | 14.2 | 62 |

[a]Units (I) are of the formula 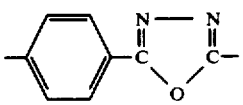

[b]Units (II) are of the formula 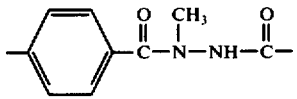

A dope, having a Brookfield viscosity of about 47,000 poise, and a solids concentration of 7%, consisting of oleum and polymer having an inherent viscosity of 3.96 was formed in the reactor. This dope was spun into fiber by extruding the dope through the spinneret into a room temperature 8% aqueous sulfuric acid bath. The pressure in the reactor (140 psig, 9.5 atm.) was sufficient to maintain the contents of the reactor in the liquid phase. The residence time of liquid in the reactor was 30 minutes. The spinneret was positioned 1.27 cm above the water bath. After passage under a guide in the bath, the fiber was passed over a water wash roll, a neutralizing roll rotating in an aqueous 8% solution of sodium carbonate, over three additional water wash rolls, a steam-heated drying roll, drawn about 3.6 × over a hot-shoe at 370° C. and wound onto a bobbin at about 350 ft./min. (106.68 m./min.). The fiber had the following tensile properties as determined on an Intron Tester (Instron Engineering Corp., Canton, Mass.) using a constant extension rate of 10% per minute with a gauge length of 10 cm:

| tenacity | 5.15 grams per denier (gpd) |
| elongation | 4.03% |
| modulus | 216 gpd |

EXAMPLE 2-7

These examples are given for the purpose of illustrating the versatility of the process of this invention with respect to controlling the conditions of the process so as to provide shaped articles of a desired oxadiazole polymer composition. In these examples experiments were carried out using the general procedure of Example 1 except that the dope was extruded from the reactor into a container and then subsequently extruded into fiber rather than being directly spun to fiber as in Example 1. The fiber in each instance was analyzed to determine its polymer composition.

I claim:

1. A process for preparing a shaped article of a polymer consisting essentially of recurring units of the formula $$- Ar - X -$$

wherein Ar is a divalent aromatic radical and X is a radical selected from the group consisting of

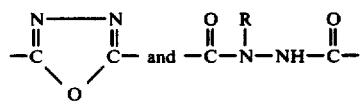

where R is a C₁ to C₄ alkyl, with the proviso that in at least 20% of said recurring units X is

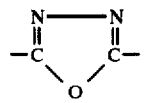

comprising:

a. continuously introducing into a continuous reactor an acid solution consisting essentially of monomers from which an oxadiazole polymer is prepared and an acid selected from the group consisting of oleum, chlorosulfonic acid, polyphosphoric acid, and mixtures thereof, said reactor being maintained at a temperature between about 100° C. and 225° C. and at a pressure sufficient to keep the contents thereof in the liquid phase, whereby said monomers polymerize to provide a dope having a Brookfield viscosity ranging from about 8,000 to 80,000 and comprising a polymer having an inherent viscosity of from about 1 to 10, and b. continuously extruding said dope into an aqueous coagulating medium to obtain a shaped article of said polymer, wherein the residence time of said monomers in the reactor is from about 2 to about 60 minutes.

2. The process of claim 1, wherein said monomers, consist essentially of (A) hydrazine sulfate and (B) one or more carbonyl-containing compounds of the formula

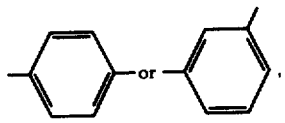

where Y is a $C_1$ to $C_4$ alkyl or —H and Ar' is

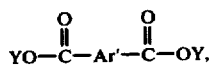

in a mole ratio of 1:1 to 1.05:1, (A) to (B).

3. The process of claim 2, wherein said continuous reactor is a tubular reactor.

4. The process of claim 2, wherein an alkylating agent is predissolved in said acid or said carbonyl-containing compound(s).

5. The process of claim 2, wherein said acid is oleum containing $SO_3$ in a 20% to 70% excess of the amount required to combine with the water formed when said monomers polymerize.

6. The process of claim 5, wherein Y is —$CH_3$.

7. The process of claim 6, wherein AR' is

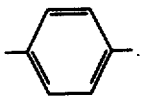

8. The process of claim 1, wherein said shaped article is a fiber.

9. The process of claim 1 wherein said acid is oleum and said reactor is maintained at a temperature between about 140° C. and 180° C.

10. The process of claim 9 wherein between 14.2 and 74.6% of said recurring units are of the formula

* * * * *